US010623309B1

United States Patent
Gampel et al.

(10) Patent No.: US 10,623,309 B1
(45) Date of Patent: Apr. 14, 2020

(54) RULE PROCESSING OF PACKETS

(71) Applicant: International Business Machines Corporation, Armonk, NY (US)

(72) Inventors: Eran Gampel, Herzliya (IL); Gal Sagie, Hod-HaSharon (IL)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 15/844,673

(22) Filed: Dec. 18, 2017

Related U.S. Application Data

(60) Provisional application No. 62/435,923, filed on Dec. 19, 2016.

(51) Int. Cl.
*H04L 12/721* (2013.01)
*H04L 12/771* (2013.01)
(Continued)

(52) U.S. Cl.
CPC .......... *H04L 45/38* (2013.01); *G06F 9/50* (2013.01); *H04L 41/0893* (2013.01); *H04L 43/04* (2013.01); *H04L 45/54* (2013.01); *H04L 45/56* (2013.01); *H04L 49/20* (2013.01); *H04L 49/3009* (2013.01); *H04L 63/0218* (2013.01);
(Continued)

(58) Field of Classification Search
CPC ......... H04L 45/30; H04L 45/38; H04L 45/54; H04L 45/56; H04L 45/58; H04L 45/583; H04L 45/586; H04L 45/74; H04L 63/02; H04L 63/0218; H04L 63/029; H04L 63/1458; H04L 67/1002; H04L 67/1004; H04L 67/1027; H04L 67/1036; H04L 49/20; H04L 49/3009; H04L 43/04; H04L 69/22; H04L 41/0893; H04L 29/06551; H04L 29/06557; H04L 29/06225; H04L 29/06925; H04L 29/08144; H04L 29/08153; H04L 29/08243; H04L 29/0827; H04L 29/08252; H04L 29/08288; H04L 29/02897; H04L 29/08738; H04L 47/125; H04L 2463/141–143; H04L 47/20; H04L 47/805; H04L 2012/568; H04L 61/256; G06F 9/50

See application file for complete search history.

(56) References Cited

U.S. PATENT DOCUMENTS

| 2016/0182408 A1* | 6/2016 | Jani ..................... H04L 49/70 370/474 |
| 2016/0205044 A1* | 7/2016 | Tripathi ................ H04L 45/66 370/355 |
| 2018/0007005 A1* | 1/2018 | Chanda ............... H04L 63/0236 |

OTHER PUBLICATIONS

Dictionary.com Definition: "ad hoc", https://www.dictionary.com/browse/ad-hoc?s=t from Mar. 17, 2016. (Year: 2016).*

(Continued)

*Primary Examiner* — Joshua Kading

(74) *Attorney, Agent, or Firm* — Schmeiser, Olsen & Watts, LLP; Mark Vallone

(57) ABSTRACT

A packet forwarding device and a system using same are provided. The packet forwarding device includes a datapath forwarding hardware unit for processing a first set of packets matching a first set of rules of a rules table. The packet forwarding device further includes a datapath forwarding software unit for generating or modifying the rules table and for processing a second set of packets matching a second set of rules of the rules table and applying a service to the second set of packets.

14 Claims, 13 Drawing Sheets

(51) Int. Cl.
*H04L 12/741* (2013.01)
*H04L 12/26* (2006.01)
*H04L 29/06* (2006.01)
*H04L 12/935* (2013.01)
*H04L 12/931* (2013.01)
*H04L 12/24* (2006.01)
*H04L 29/08* (2006.01)
*G06F 9/50* (2006.01)
*H04L 12/775* (2013.01)
*H04L 12/713* (2013.01)

(52) U.S. Cl.
CPC ...... *H04L 63/1458* (2013.01); *H04L 67/1002* (2013.01); *H04L 69/22* (2013.01); *H04L 45/583* (2013.01); *H04L 45/586* (2013.01)

(56) References Cited

OTHER PUBLICATIONS

"On the fly" retrieved on Oct. 3, 2019 from the Internet: <URL: https://whatis.techtarget.com/definition/on-the-fly>, 1 page.

* cited by examiner

RULE PROCESSING OF PACKETS

RELATED APPLICATION/S

This application claims the benefit of priority under 35 USC § 119(e) of U.S. Provisional Patent Application No. 62/435,923 filed on Dec. 19, 2016, the contents of which are incorporated herein by reference in their entirety.

BACKGROUND

The present invention relates to a datapath forwarding device having hardware and software units for processing packets and, more particularly, to a datapath forwarding device having a software unit capable of generating or modifying a rules table of utilized by the device and for processing and applying advanced services to select packets. The present invention also relates to a system having a plurality of datapath forwarding devices serving a data center.

A data center includes physical servers typically housed in rack units. The physical servers within a rack unit may be managed by a top of rack (ToR) or end of row (EoR) switch that forwards communications between external network elements and the servers (FIG. 1). Each physical server can be configured to host one or more virtual machines or containers arranged in virtual networks or subnets. The virtual machines/containers are assigned context identifiers, such as an Internet Protocol (IP) address, Media Access Control (MAC) address and subnet assignment to enable communications between virtual machines/containers.

The datapath switch (also termed herein as "access layer" or "datagraph" switch) is responsible for forwarding packets from external or internal network elements (aggregate layer switches/routers/other datapath switches) to physical and/or virtual elements of a rack. In order to provide such functionality, the switch is provided with one or more dedicated hardware (HW) units specifically configured for processing packets based on rules (stored in a "rules tables—also referred to herein as "lookup tables", "openflow tables" or "forwarding pipeline tables").

SUMMARY

According to one aspect of the present invention there is provided a packet forwarding device comprising a datapath forwarding hardware unit configured to process a first set of packets matching a first set of rules of a rules table; and a datapath forwarding software unit configured to generate or modify the rules table and to process a second set of packets matching a second set of rules of the rules table and apply a service to the second set of packets.

According to another aspect of the present invention there is provided a system for applying services to packets flowing through a datapath comprising a pack forwarding device having a datapath software unit configured to provision software modules at locations along a packet forwarding graph of a data center, wherein each of the software modules is configured to apply a service to the packets at a specific location within the packet forwarding graph.

According to another aspect of the present invention there is provided a packet forwarding device comprising a datapath forwarding hardware unit configured to process a first set of packets matching rules of a predefined rules table; and a datapath forwarding software unit configured to process a second set of packets not matching the rules and apply a service to the second set of packets.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the device, system and method of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION

Figure 1:
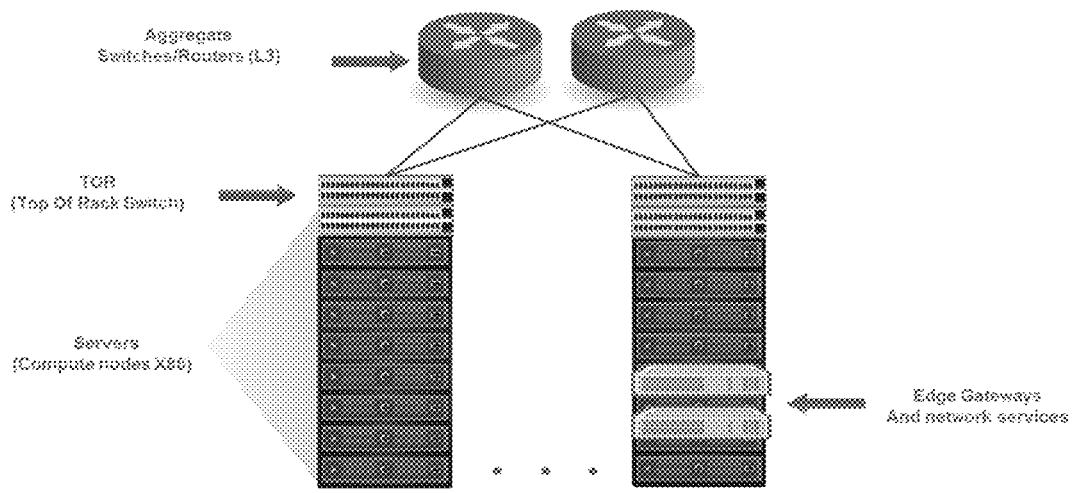
FIG. 1 illustrates a prior art configuration of data center racks.

The present invention is of a packet forwarding device and system using same which can be used to process packets and apply advanced services thereto within the data path (in-path) of a data center.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Switches as well as other forwarding devices are highly efficient in processing and forwarding 'common' types of packets and less efficient in handling packets that require application of advanced services.

Switch HW units are very efficient at handling packets matching the lookup rules since they are designed primarily for quickly processing and forwarding large volumes of packets. However, packets which cannot be matched to lookup rules can create bottlenecks and can considerably slow down packet processing and forwarding to servers. This is especially true when processing of specific packets requires application of advanced services such as firewall services. In such cases, the packets must be handled by an external device (out of the optimal data path between original source and destination) such as a security device in the case of firewall services. This device can be a physical or a virtual appliance which receives the packets, applies a service thereto and forwards the processed packets to the final destination (e.g. server).

These limitations of data center switches can be addressed by adding specific purposes hardware elements on the switch for processing of specific capabilities, for example adding a network processing unit for applying stateless ACL on the traffic in order to implement one kind of functionality of the firewall.

However, due to their limited memory and programmability such solutions cannot maintain the state of connections traversing therethrough for a large number of connections as required by advanced networking services such as Stateful FW, Load Balancing and others. In addition, since the programmability of such solutions is limited to whatever the HW provides, adding new capabilities is limited by development of new HW and application specific integrated circuit (ASIC) components.

While reducing the present invention to practice, the present inventors have set out to traverse the limitations of presently used forwarding devices to:

(i) significantly reduce CPU/Memory needed in each compute host (server) in a rack;

(ii) increase the network virtualization solution scale by a minimum of 40x (number of servers per rack);

(iii) allow smart location and transparent integration of network services; and (iv) leverage "limited fixed functionality" devices on the data path (e.g. switches and routers) to provide services on demand with lower latency and simplified integration.

To provide the above, the present inventors devised a datapath forwarding device (e.g. access layer switch) capable of efficiently processing large volumes of packets using dedicated hardware while also being capable of efficiently and quickly handling packets which cannot be handled by the HW using a configurable, extensible and flexible in-path software (SW) unit which is also capable of ad hoc application of advanced services to packets.

This combined HW-SW forwarding device can be preloaded or loaded on the fly with several types of service modules that can be linked. The modules can be linked through a "service chain" that composes and customize the final service. For the following service chain: DDOS→(if safe)→FW→(if ok)→LB, describes 3 modules (DDOS, FW, LB) that are linked together to form a chain of services that handles packet traffic of a specific type. These 3 modules can be hosted on one "forwarding device" (or distributed between a forwarding device and one or more servers) to form a customizable packet processing pipeline within the data path.

A modern data center includes a large number of isolated virtual networks for virtual machines and containers. Each of these networks must have its own isolated rules table on the service (for example firewall) and hence the software unit must be able to support a high enough amount of these isolated tables and services.

A TOR switch is connected to all the servers in a rack. These servers have virtual machines (or containers) from different virtual networks and tenants. The SW unit can provide each tenant (of hundreds or thousands of tenants) with a dedicated virtual firewall on the TOR. Thus, the present SW unit can execute a thousand virtual services (e.g. virtual FW) isolated from each other, each with its own set of rules.

Thus, according to one aspect of the present invention there is provided a packet forwarding device. As used herein, the phrase "packet forwarding device" refers to any device responsible for forwarding packets from network elements (aggregate layer switches/routers, top of rack switches) to physical and/or virtual elements of a rack/cluster of a data center. Examples of forwarding devices include, but are not limited to, switches, routers, computing nodes and the like.

The forwarding device of the present invention includes a datapath forwarding hardware unit for processing a first set of packets matching a first set of rules of a rules table. This hardware unit can be similar in functionality to prior art hardware unit/chip that is commonly used in switches (e.g., TOR chip manufactured by Broadcom). Alternatively, the HW unit can include 3 stacked/connected special NICs each including a switch chip (e.g. available from Intel).

The present device also includes a datapath forwarding software unit (also referred to herein as datapath CPU) for generating or modifying the rules table and for processing a second set of packets matching a second set of rules of the rules table and applying a service to the second set of packets.

An example of one embodiment of a forwarding device of the present invention is further described hereinbelow with reference to FIGS. 4A-C.

Packets typically handled by the HW unit (first set of packets) are those that do not require further processing or application of advanced services or packets that were processed and match preconfigured HW rules.

As is mentioned hereinabove, such packets are efficiently processed and forwarded by the HW unit to servers for further processing. The second set of packets are those that typically require services that cannot be directly provided by the HW unit (require processing by an external device out of the data path) or require special handling (e.g. packets that form a part of a malicious attack, packets that require application awareness or parse of applicative headers that are unknown to the HW unit or need to perform diverse actions or keep a large state which doesn't fit into the limited memory of the HW unit).

The present device is configured (preconfigured or configured on the fly—ad hoc) to receive the second set of packets and provide such advanced services. Ad hoc provision of services can be triggered by a policy change detected by the datapath forwarding software unit; the policy change can modify the rules table in order to associate packets to the second set of packet and trigger creation of a new service. The policy change can be instated by a user or by another orchestration/automation system of the data center. For example the CMS (cloud management system) can create virtual machines, append them to virtual networks and express security or other higher level services needed, the present invention can detect these changes and compile them to the needed service graphs. A policy change can also be inserted by the forwarding device, or another remote device of similar functionality. For example, if the forwarding device detects uncommonly high traffic volumes, it can automatically add a DDoS protection module on the fly.

The policy itself dictates the services needed, how are they connected and what SLA (service level agreement) they should comply to.

After a policy is configured, the SW unit compiles and initiates services in one or more devices (switch, server etc), dynamically scales the services as needed, enforces their high availability policy constraints, enforces the resource usage limits and latency requirements and chains the various service modules (according to the policy).

For example, when a user adds a policy for a DDoS protection module, this policy can be translated to include several instances (copies) of the DDoS protection module (FIG. 5E) and a module that can split the traffic among the various instances without intervention from the user. These instances can run on different devices (for example some can run on the server themselves (FIG. 5G) and scheduling of instances is done by the SW unit to maximize results.

The services are provided by software modules that form a part of the software unit of the present device. The forwarding software unit can be preconfigured to include various software modules for providing in-path services to packets or to be configured on the fly (ad hoc), i.e. "injected with" a software module for applying service. Examples of such services include, but are not limited to, DDoS Protection, DPI (Deep packet inspection), IPS (Intrusion prevention system), IDS (Intrusion detection system), Lawful interception, Load balancing, Firewall, Carrier Grade NAT, Tunneling, L3 Routing, L2 Forwarding, Database Proxy, Monitoring, Anomaly Detection, WAN optimization, TCP optimization, Header enhancement, Video encoding, Compression, QoS, Cache, audio/video and VPN.

The SW unit can also modify the rules table based on packet history, i.e. new rules can be added to associate packets with the first set of packets for processing by the HW unit. For example, a DDoS module detected that a certain client is an attacker trying to harm the system by flooding it, the module can add a HW rule to block all traffic from this client (in such case the traffic will no longer be sent to the software module).

Figure 2A:
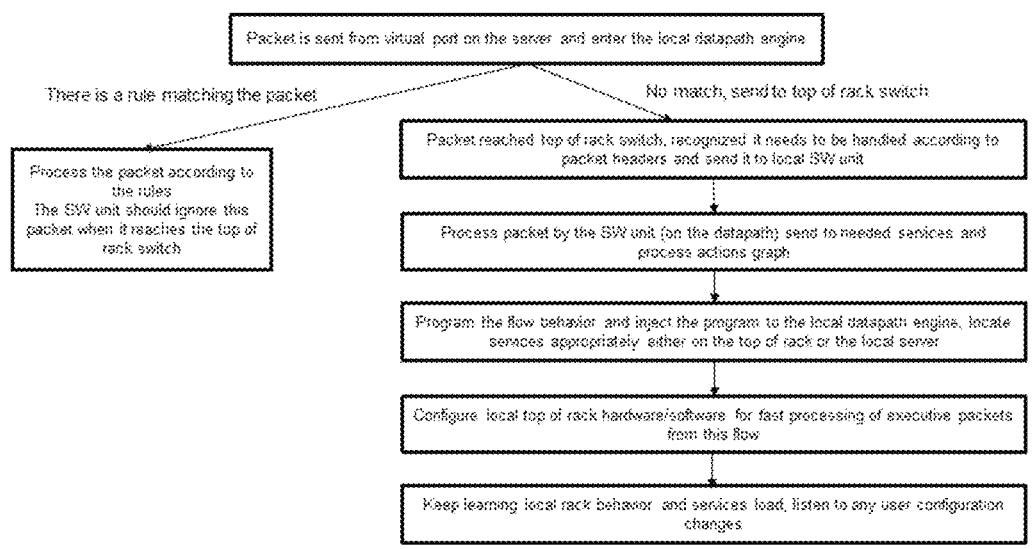
FIGS. 2A-B are a flowchart illustrating Top of Rack (ToR) packet processing (FIG. 2A) and service provision (FIG. 2B) using a ToR switch constructed in accordance with embodiments of the present invention.
Figure 2B:
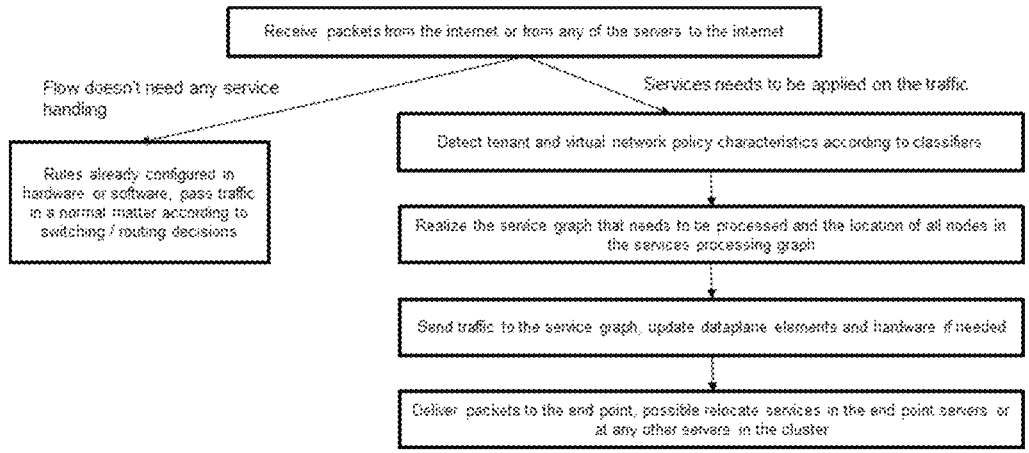

Referring now to the drawings, FIGS. 2A-B illustrate packet processing as carried out by a ToR switch constructed in accordance with embodiments of the present invention.

The switch includes a software unit for routing rules-matching packets to a HW unit for processing and forwarding (e.g. to end point servers of the cluster/rack). The end point servers of the cluster/rack have a programmable data path which is initially empty and as such, traffic first traverses the SW unit of the top of the rack switch.

The SW unit receives unmatched packets and processes them according to the second set of rules of the rules table. As is mentioned hereinabove, the rules table can be modified to associate packets with the first or second set based on policy changes or the type of packets handled by the switch over time. For example, packets that are processed by the SW unit and can be processed faster by the HW unit can trigger a rules change to route all such future packets to the HW unit.

The SW unit can direct the traffic to a specific service running in the ToR switch and also place the service on the server itself and direct traffic to it via specific rules in the programmable datapath (using various technologies such as OpenFlow, Kernel eBPF, NIC virtual functions or any other proprietary datapath engine).

The state of the environment and the networking policy is located in a distributed database or a centralized management controller which can distribute changes to all rack-specific switches. The changes are saved only in the SW unit of a ToR switch and thus the number of managed entities is much lower than that used today.

This in-datapath approach for processing packets reduces the need to send arbitrary packets to unknown locations of a physical infrastructure and wait for an answer (as is carried out by SDN solutions with PACKET_IN).

Figure 3A:
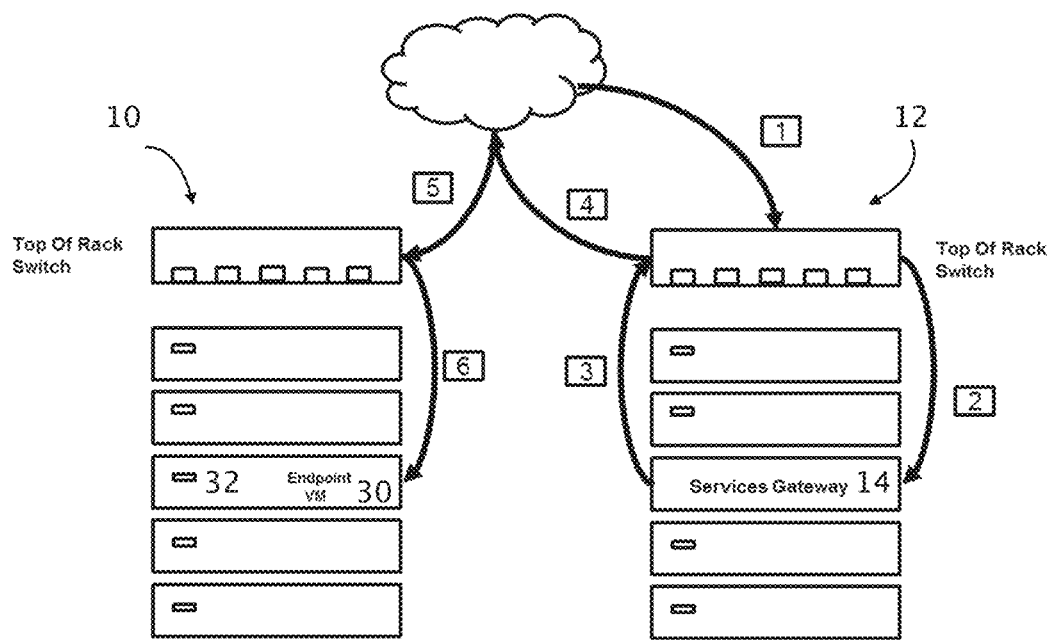
FIGS. 3A-B illustrate policy-based traffic flow and provision of services as effected via prior art approaches (FIG. 3A) and embodiments of the present approach (FIG. 3B).
Figure 3B:
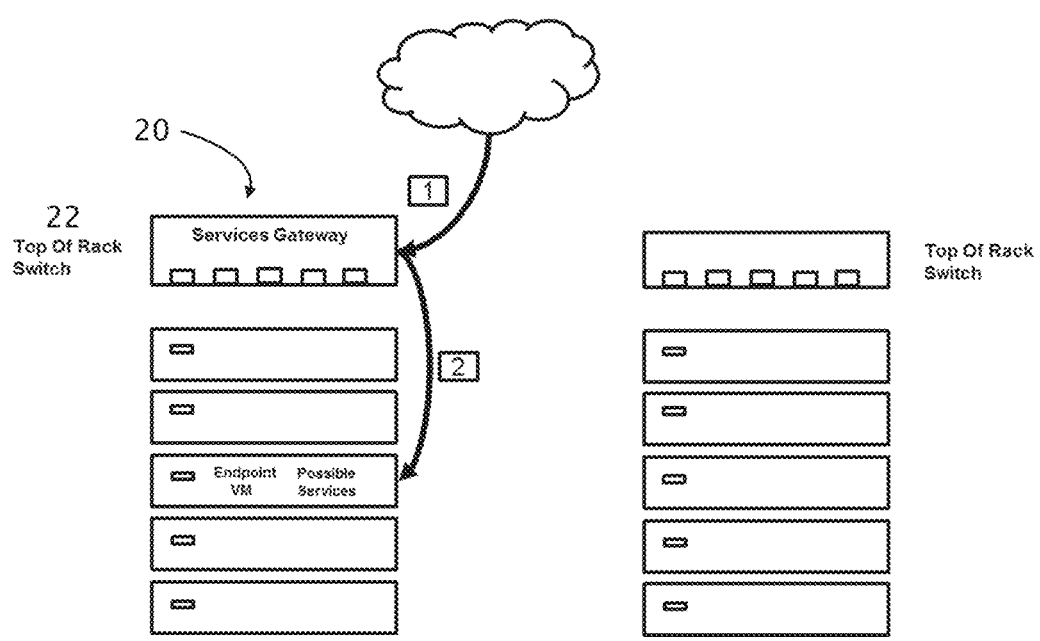

FIGS. 3A-B illustrate traffic flow through a prior art rack 10 configuration (FIG. 3A) and through a rack 20 employing a ToR switch 22 constructed according to the present invention (FIG. 3B).

FIG. 3A illustrates public traffic that is destined to a virtual machine 30 inside a server 32 in rack 10 but one or more services need to be applied to this traffic (for example firewall or DDoS protection). The service appliance 14 is located in a different rack (12), and as such, traffic is first forwarded to rack 12 and then to the final destination (steps 1-6). This increases the number of network hops for the traffic (6 instead of 2) thus increasing congestion and slowing down the network.

FIG. 3B illustrates a rack 20 having a ToR switch constructed in accordance with embodiments of the present invention. Since the service is deployed within ToR switch 22, the traffic path is shorter and the network hops are minimized and located on the path to the destination VM.

In order to include the SW unit within the ToR switch, requires modification to the switch architecture and interconnects.

Figure 4A:
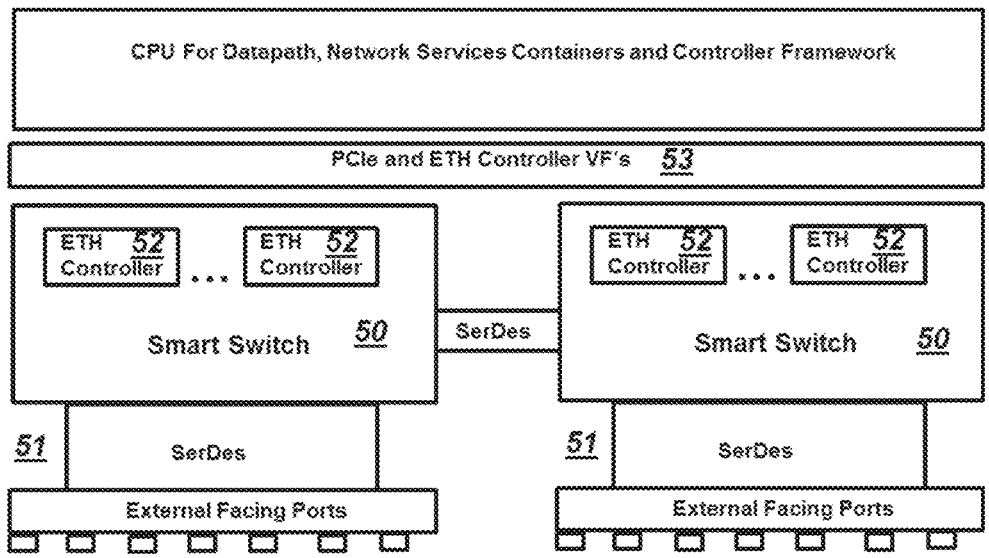
FIGS. 4A-C schematically illustrate embodiments of a ToR switch constructed according to the present invention.
Figure 4B:
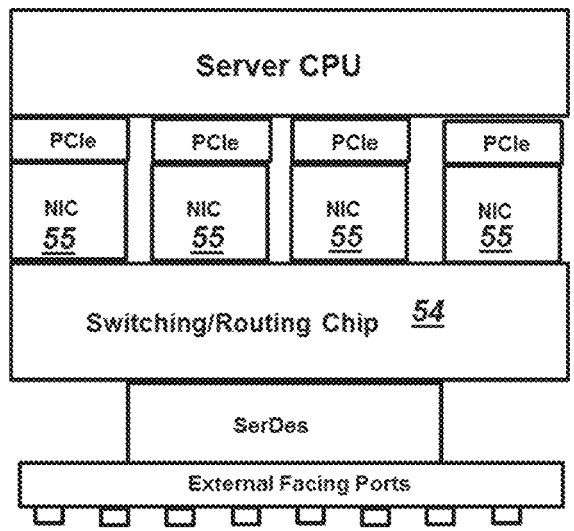
Figure 4C:
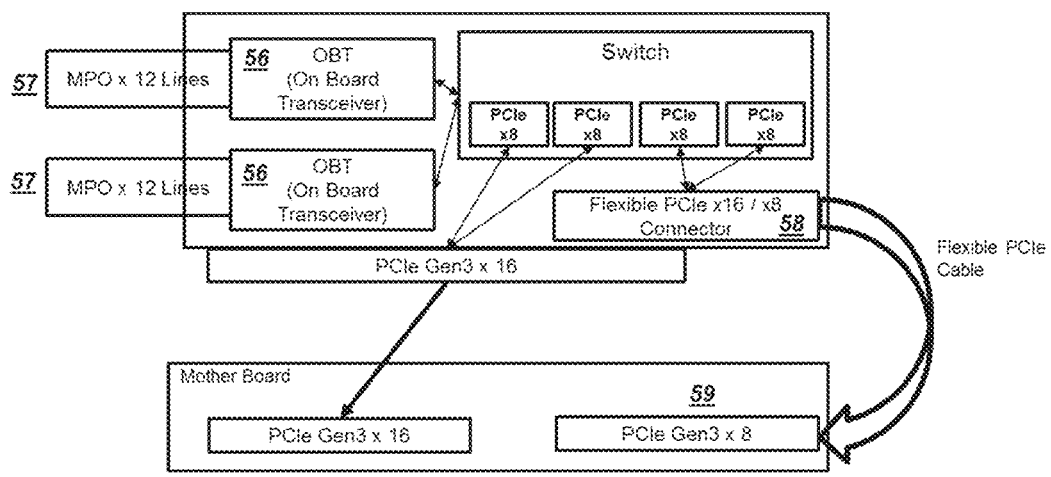

FIGS. 4A-C schematically illustrate architectures of switches constructed in accordance with the teachings of the present invention.

FIG. 4A illustrates a hardware design for a ToR switch that includes a number of smart NICs (50) (smart switches) stacked together (connected in a mesh network—each one connected to the others). These "smart NICs" have external SerDes (51) (Serializer/Deserializer) for external ports and also have Ethernet controllers (52) that can be attached directly to a central processing unit (CPU) (SW unit) over component interconnect express (PCIe) channel (53).

FIG. 4B illustrates a hardware design for a ToR switch that includes a common switch chip (54) (e.g., commercially available from Broadcom or, Mellanox) that is connected to a CPU (SW unit) using four network interface cards (NIC) (55) that act as Ethernet to PCIe converters. This design can support higher number of external ports and a higher switching bandwidth.

FIG. 4C illustrates a PCIe card that can function as a "mini switch" and has an on board transceiver (56). This card can support up to 24 different external connections provided with an MPO split cable (57). This card utilizes the same "Smart NIC" shown in FIG. 4A.

A common PCIe card on a motherboard of common servers has a x16 lanes plug that can support ~100 GBps traffic to the CPU. In order to double this throughput, the present invention can utilize NICs that support up to 200 GBps traffic to a CPU (SW unit) which is introduced as an extension to this NIC. This extension is a PCIe connector with a flexible cable (58) that can plug to another x8 or x16 plug in the motherboard (59) and provide ~200 GBps to the CPU.

It will be appreciated that although the present invention has been described above in context with a ToR switch, the SW unit functions thereof can be implemented within any packet forwarding device along the data graph of a data center cluster (e.g. rack).

In addition, software modules created by the SW unit of the present invention (residing within a forwarding device) can be located anywhere along the data graph to handle both north-south and east-west traffic. The software modules can be executed on any resident CPU). One such example is provided in the Examples section which follows which describes a DDoS module executed on a CPU of a server to apply a DDoS service flowing therewithin.

Thus, according to another aspect of the present invention there is provided a system for applying services to packets flowing through a datapath. The system includes a packet forwarding device having a datapath software unit (similar to that described above) for positioning software modules along a data graph of a data center. Each software module can run at a specific location (on a CPU of a datapath component, e.g. server, switch or router) to apply a service to the packets at that specific location within the packet forwarding graph.

Service modules can also be located in an edge router that connects enterprises/clients to the cloud. The edge router can be located either on premise (CPE) in the client location or in the service provider end. Service modules can also be located in an aggregate router or edge gateway device which connects few "simple" low-end ToR racks together and bridges between these racks (which only has bare metal servers) and a virtualized environment with VMs and containers (and hence the gateway allows the user to connect bare metal servers into virtual networks and virtual services). A service module can also be split across two ToRs (with a first portion on the source ToR and a second portion on the destination ToR).

It is expected that during the life of this patent many relevant forwarding devices will be developed and the scope of a "forwarding device" is intended to include all such new technologies a priori.

As used herein the term "about" refers to ±10%.

Additional objects, advantages, and novel features of the present invention will become apparent to one ordinarily skilled in the art upon examination of the following examples, which are not intended to be limiting.

EXAMPLES

Reference is now made to the following example, which together with the above descriptions, illustrate the invention in a non limiting fashion.

In-Path DDoS Protection Service

In presently used DDoS solutions traffic is routed from the client to an out of path DDoS service appliance (a virtual or physical appliance). The traffic then needs to be routed from the appliance to the destination VM. This over-complicates the network topology and increases the number of hops of traffic from client to destination.

Figure 5A:
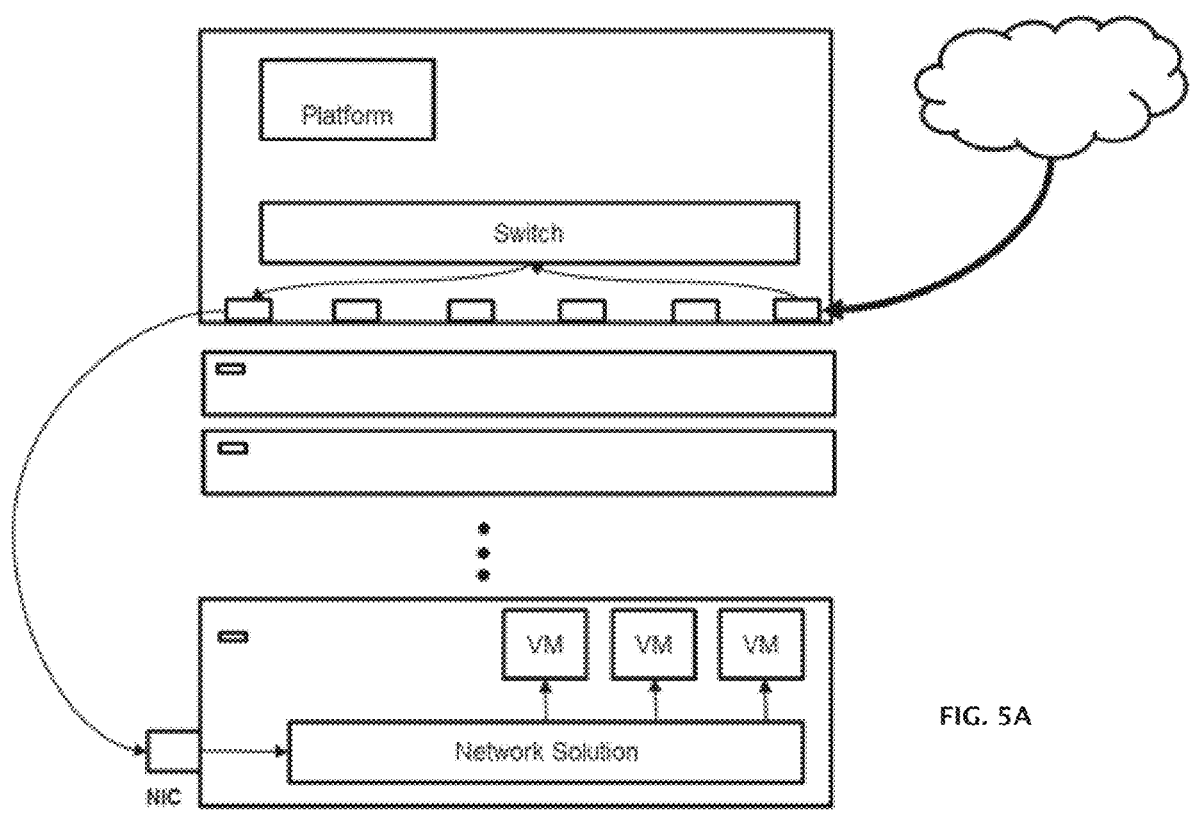
FIGS. 5A-G illustrate in-path DDoS protection as provided by the present invention.

In the scenario shown in FIG. 5A, public HTTP requests from the Internet enter a data center utilizing the switch architecture of the present invention are dispatched to 3 VMs sitting at the same server in one of the racks.

A user then decides to enhance VM services by deploying a DDoS security module that protect against SYN attacks.

Figure 5B:
Figure 5C:
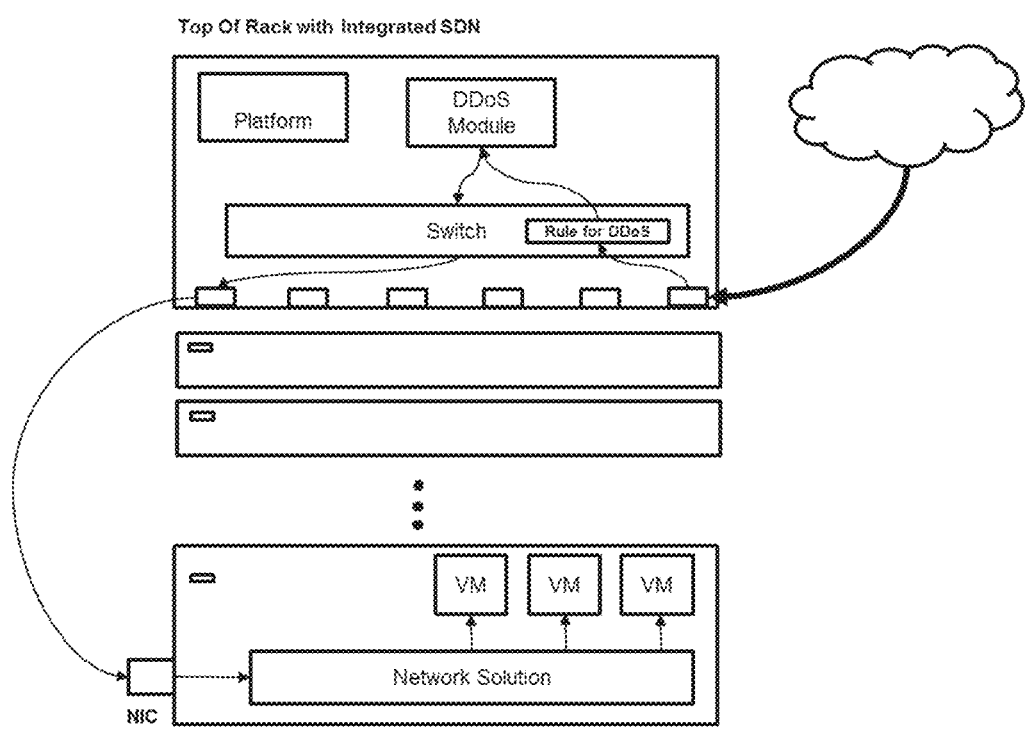
Figure 6:
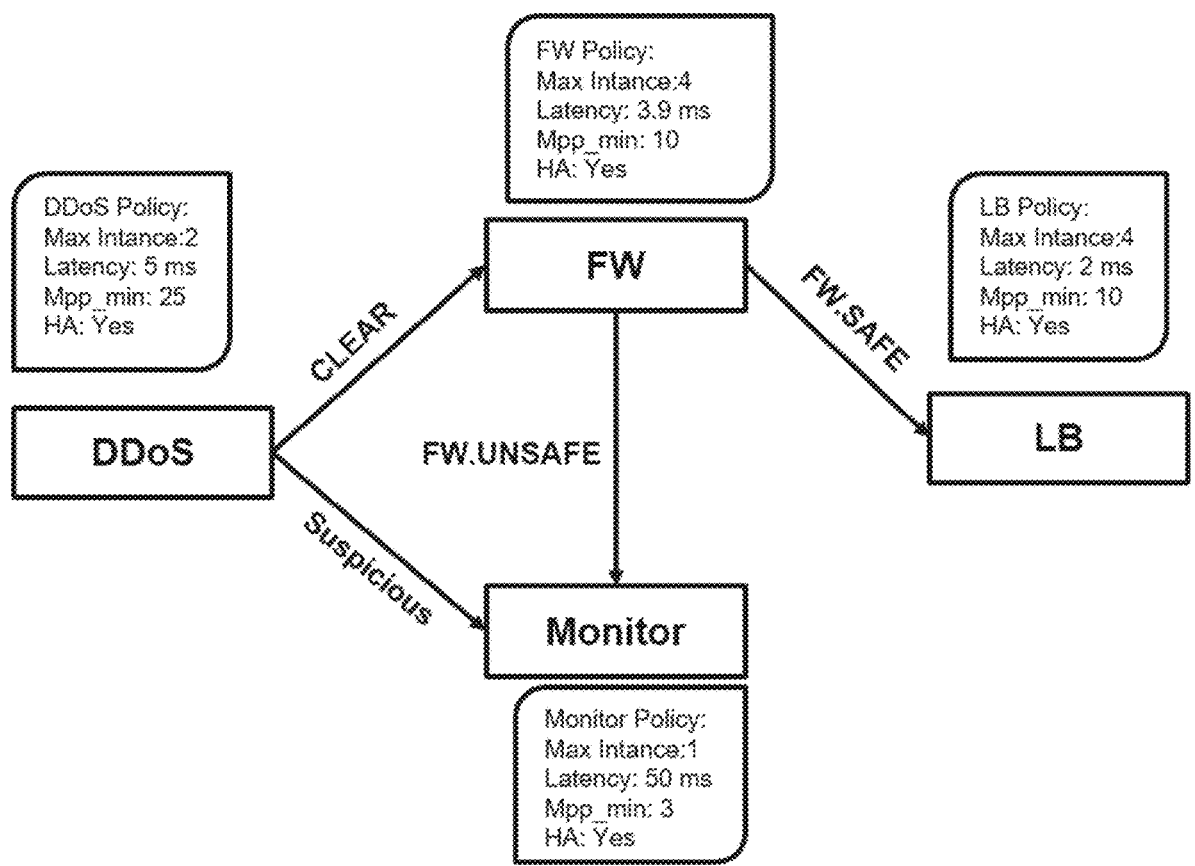
FIG. 6 illustrates an example of a graph pipeline policy definition.

The user defines a policy in a simple graph manner by applying a classifier connecting the 3 VMs to a DDoS module that allows only SAFE traffic to be forwarded to a final destination (FIG. 5B and FIG. 6). The policy is distributed such that all relevant ToR switches of the present invention detect the policy and create a DDoS module anywhere along the data path with no need for any special integrations with networking solutions (FIG. 5C). This architecture can also be used as a "bridging gateway" between various different networking solutions.

Figure 7A:
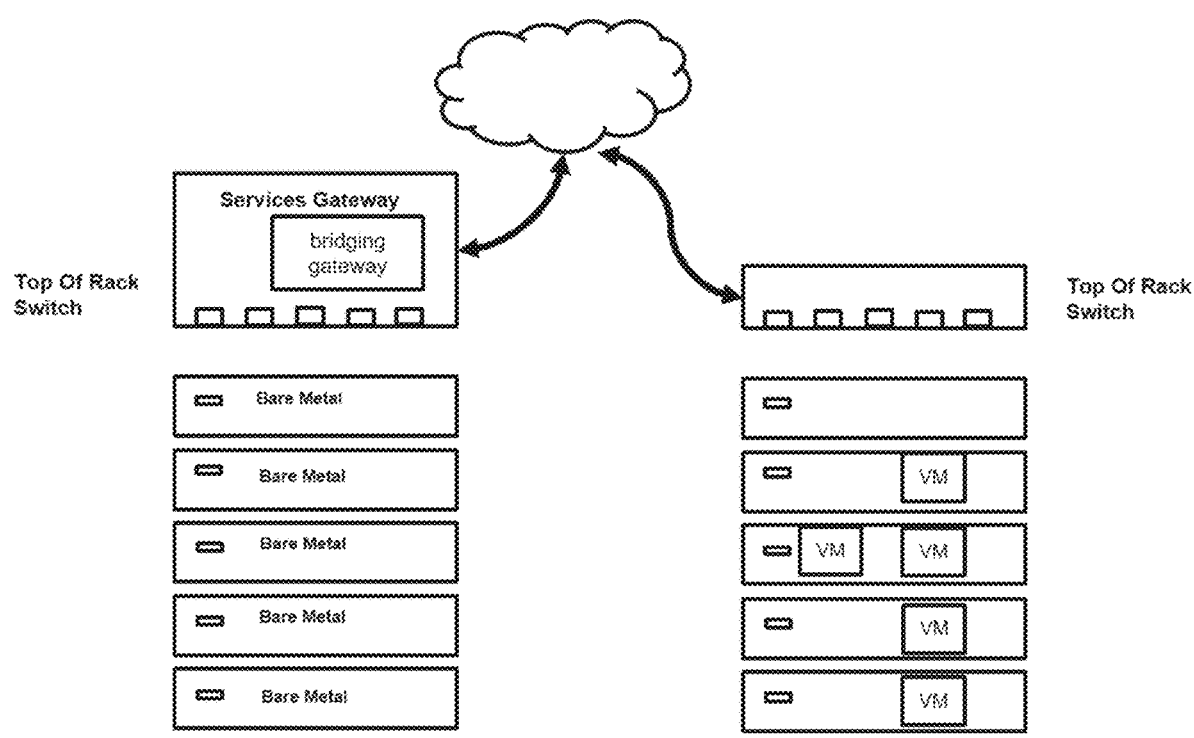
FIGS. 7A-B illustrate a bridging gateway implemented at the ToR (FIG. 7A) and at a 'hub' for multiple ToRs (FIG. 7B).
Figure 7B:
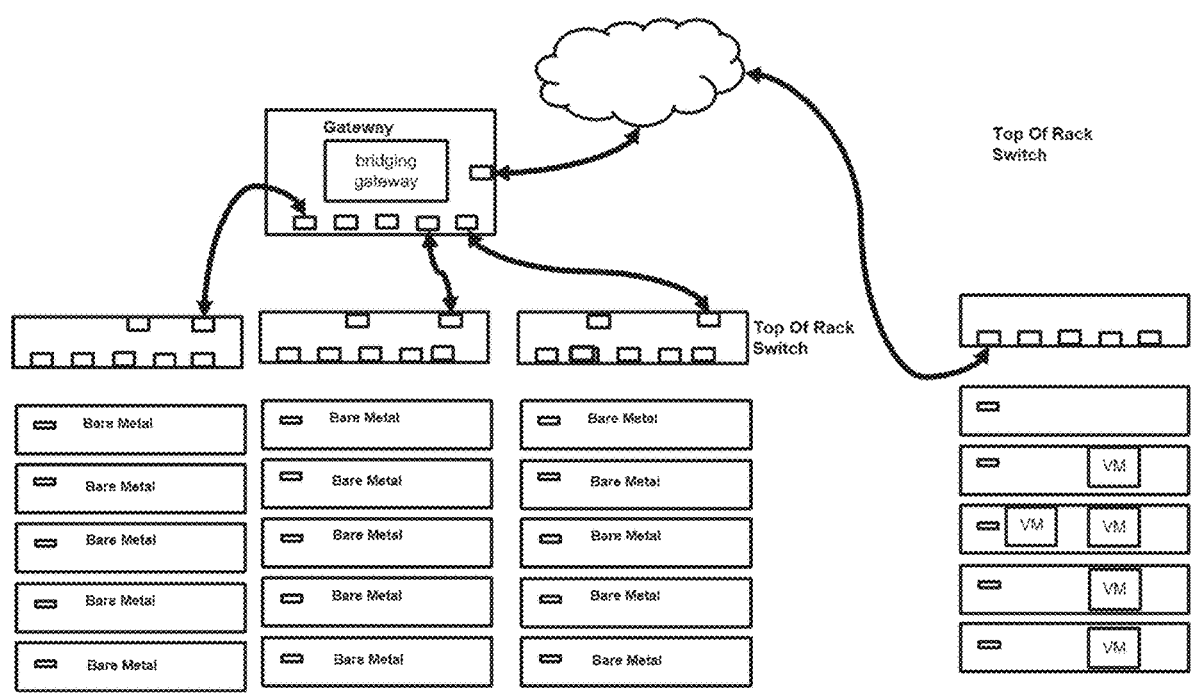

For example, in a rack including bare metal servers and servers that include virtual machines (VMs), the present ToR switch can be used to bridge and connect between different domains/solutions (FIG. 7A) (and still enforce the services needed in the same manner). Another solution for bare metal and virtualized environment bridging can use the same architecture and include the service in a point higher in the data center hierarchy, in a service cluster or appliance that serves as a hub for multiple ToRs (FIG. 7B). The same architecture can be used to bridge multiple networking environments and virtualization solutions; the "bridging gateway" module can be added in any point on the DC hierarchy that support programmability.

The DDoS module replies to SYN requests only with a SYN cookie challenge (or a JavaScript challenge that request a device signature from the client which can later be identified by the module). Thus, the DDoS module mimics a server and answers a connection establishment request from a client without actually opening any state tables in the server.

The client receives a "challenge" and needs to reply correctly in order for traffic originating from the client to be transferred to the server. This limits the ability of the client to send high volume traffic and flood the server with requests.

Figure 5D:
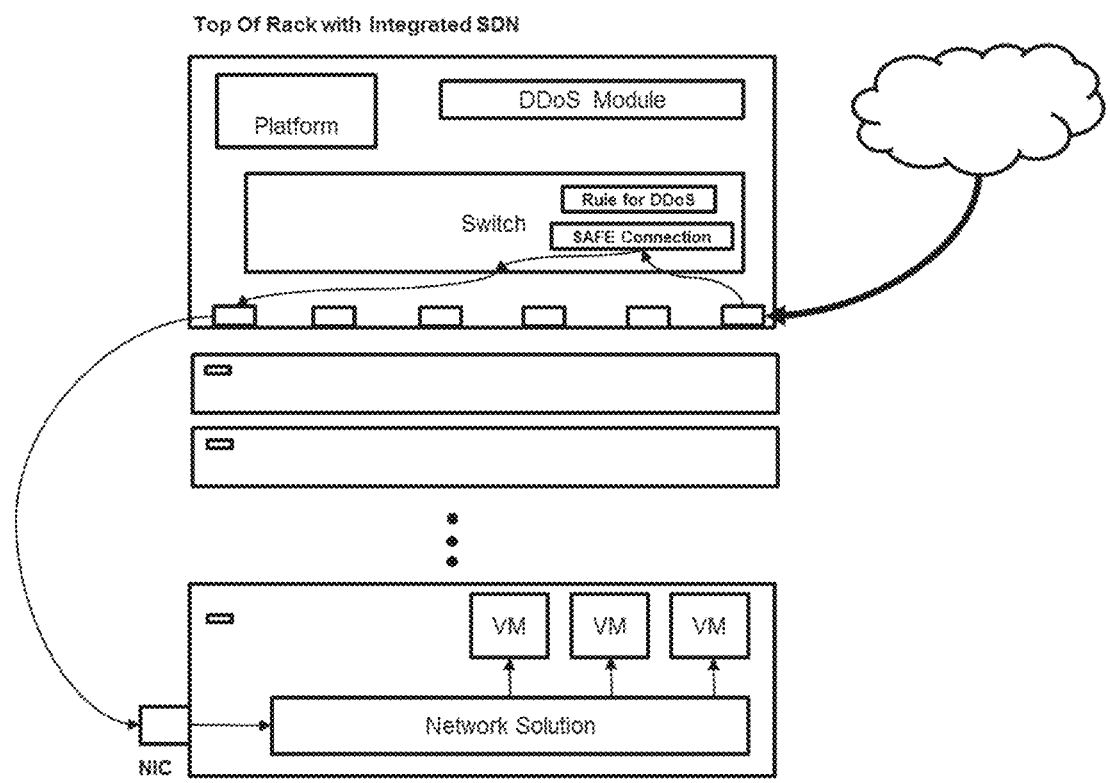

After a connection is safe the DDoS module offloads traffic to the hardware to avoid unneeded traffic from entering it again (FIG. 5D). Thus, traffic is only sent to the DDoS SW module at the start of the connection. After a connection is verified as valid, the SW module adds a rule to the HW table that routes subsequent packets through the HW unit which in turn forwards them to the destination (server, VM).

The DDoS module also logs signatures of clients which fail to answer the challenge to a black list which can be distributed across the data center (as well as other data centers).

Figure 5E:
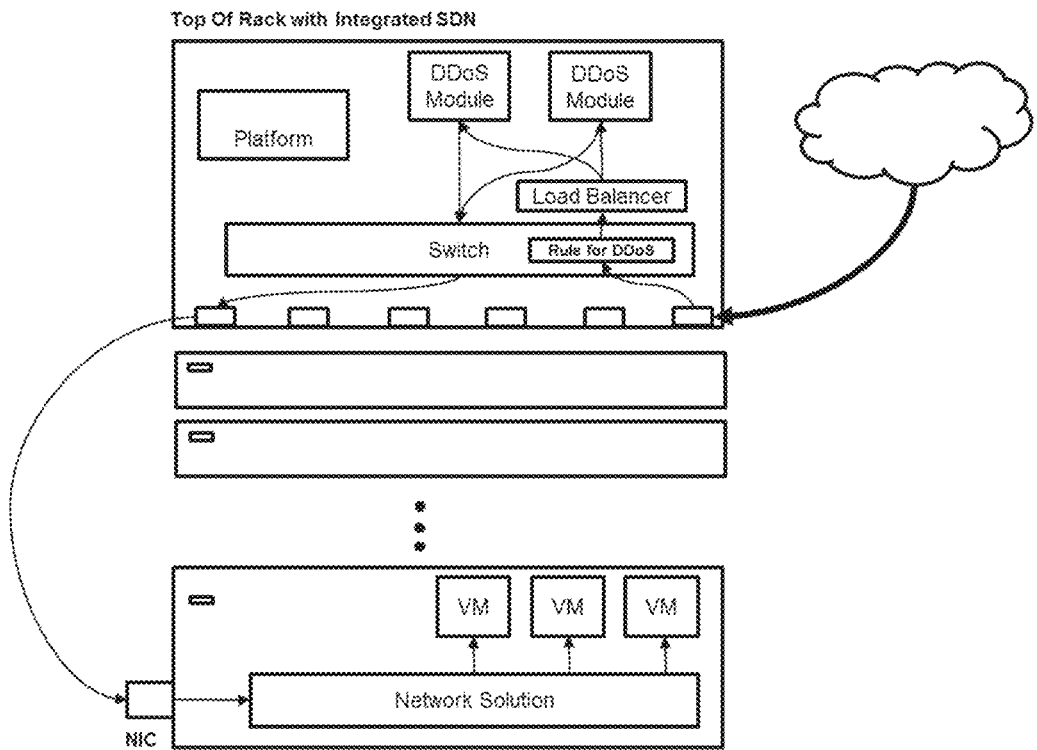

In response to a DDoS module being overloaded with traffic, the present invention can easily scale and add another DDoS module to handle additional traffic which can be split across modules via a load balancer module which is created or designated on the fly by the switch SW unit (FIG. 5E)

The load balancer module can be implemented in the HW or SW units of the switch. The load balancer typically splits the traffic evenly between the DDoS modules and maintains connection affinities (connection that is handled by one module is always handled by the same module, only new connections can be sent to the new DDoS module).

Load balancing can also be carried out between various distributed ToR switches under control of a centralized controller.

Thus, the present invention allows injection of services into the data path without a need for close integration with networking solutions. In addition, the present invention allows a user to leverage standard networking protocols to connect between physical devices and virtual devices (for example boarder gateway protocol—BGP)

The above described scenario describes services running within a ToR switch however, the present invention can also run and manage services anywhere along the datapath (in any forwarding device) and in the server itself or distribute numerous types of services across the data graph.

Figure 5F:
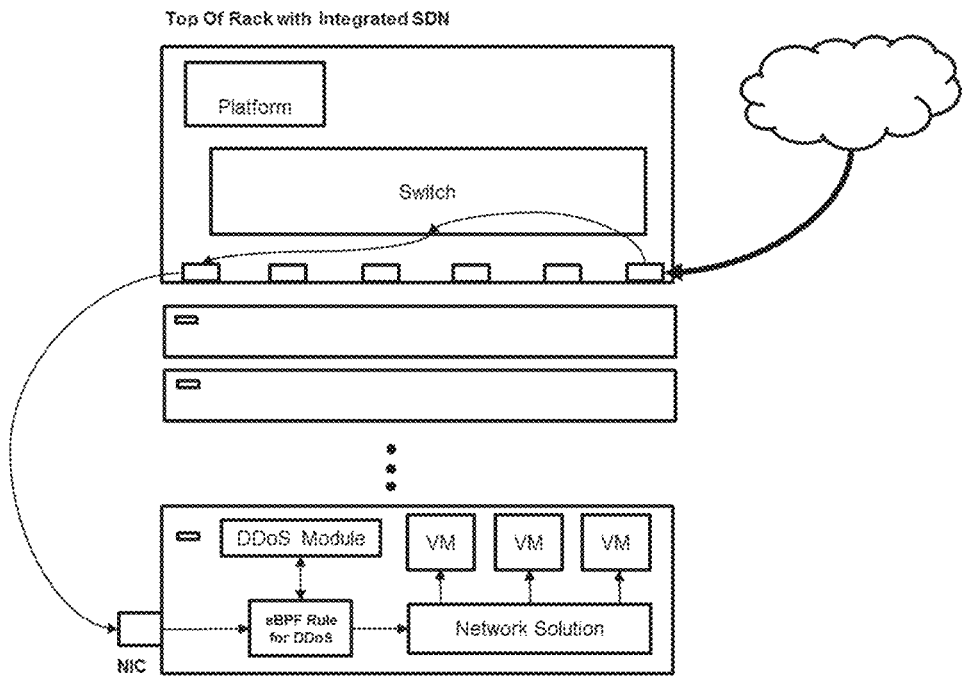

Running services in the server can be advantageous in that it reduces resource usage in the ToR switch. In the case shown in FIG. 5F, all possible destination VMs are in the same server and thus can run the service provided free resources are available.

In addition, running a services in the server also allows to address east-west internal traffic inside the same server (between two VMs) which cannot be handled by a DDoS module of a ToR switch.

In server services can be instated and carried out using eBPF or SR-IOV and virtual functions on the server.

eBPF is a Linux kernel technology that lets you inject and run a safe code in the server kernel. This technology allows addition of 'hook' functions that apply to traffic before the traffic enters the kernel network stack and after the traffic is received from the network card. With these hooks, one can add code that directs certain traffic to the DDoS modules in a transparent way and essentially extends the path from the ToR switch. This in fact allows the ToR CPU (of the SW unit) to utilize the CPU of the server to run the DDoS module and apply the service.

Figure 5G:
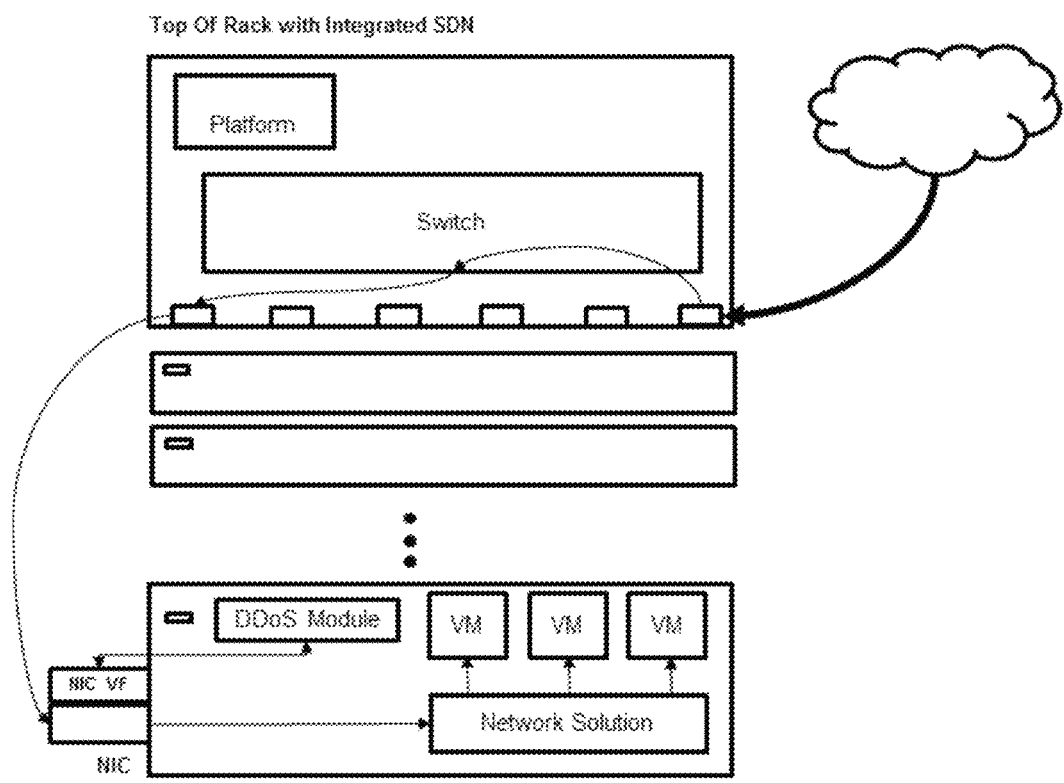

The virtual function on a network interface card (NIC) can be used in a similar manner to "inject" a module into the server. A NIC can be programed to send specific traffic to a certain virtual function interface, this interface can be tapped by the DDoS module to hijack specific traffic prior it entering the network stack (FIG. 5G).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A packet forwarding device, comprising:
    a datapath forwarding hardware unit configured to generate a rules table comprising a first set of rules and a second set of rules, said datapath forwarding hardware unit configured to process a first set of packets matching the first set of rules in the rules table, said datapath forwarding hardware unit comprising multiple network interface cards (NICs), said datapath forwarding hardware unit comprising a switching functionality either within the multiple NICs or in a switching chip within the datapath forwarding hardware unit that is exterior to the multiple NICs;
    a datapath forwarding software unit configured to process a second set of packets matching the second set of rules in the rules table, wherein one or more software modules in the datapath forwarding software unit provides a service and applies the service to the second set of packets, and wherein the datapath forwarding software unit is configured to, in response to detection by the datapath forwarding software unit of a policy change, create in the packet forwarding device one or more software modules on the fly based on the policy change and modify the rules table to generate a rule change based on the policy change, and wherein the policy change is stored in the datapath forwarding software unit; and
    at least one peripheral component interconnect express (PCIe) interface that connects the multiple NICs in the datapath forwarding hardware unit to the datapath forwarding software unit.

2. The device of claim 1, wherein the one or more software modules is a plurality of software modules, wherein the datapath forwarding software unit is configured to, in response to the detection by the datapath forwarding software unit of the policy change, create in the packet forwarding device a service chain that customizes a final service, and wherein the service chain links the plurality of software modules together to form a chain of services, of the customizes final service, that handles packet traffic of a specific type.

3. The device of claim 1, wherein the rule change routes packets previously processed by the datapath forwarding software unit to being subsequently processed by the datapath forwarding hardware unit.

4. The device of claim 1, wherein the rule change routes packets previously processed by the datapath forwarding software unit to being blocked from being processed by the packet forwarding device.

5. The device of claim 1, wherein the packet forwarding device is a top of rack (ToR) switch disposed in a rack, wherein the rack comprises stacked rack units and a plurality of servers, wherein each server in the rack is in a respective rack unit of the plurality of the rack units, and wherein the ToR switch is connected to each server in the rack.

6. The device of claim 5, wherein the servers in the rack have virtual machines from respective different tenants, wherein the packet forwarding device provides each different tenant with a dedicated virtual firewall, and wherein each dedicated virtual firewall has a set of rules specific to said each dedicated virtual firewall.

7. The device of claim 1, wherein the datapath forwarding hardware unit and the datapath forwarding software unit are each a data link layer forwarding unit and/or a network layer forwarding unit.

8. The device of claim 1, wherein the service changes or marks a header of the second set of packets.

9. The device of claim 1, wherein the service modifies a payload of the second set of packets.

10. The device of claim 1, wherein a software module of the one or more software modules applies the service to said packets at a location on a data path remote from the packet forwarding device.

11. The device of claim 10, wherein the software module applies the service to east-west packets flowing from a first virtual machine to a second virtual machine.

12. The device of claim 1, wherein each NIC of the multiple NICs is a smart switch comprising the switching functionality and further comprising a plurality of controllers attached directly to the PCIe interface.

13. The device of claim 1, wherein the switching functionality is in the switching chip, and wherein the multiple NICs are configured to perform Ethernet to PCIe conversion.

14. The device of claim 1, wherein the policy change is stored only in the datapath forwarding software unit.

* * * * *